H. SILBERT.
EYEGLASS MOUNTING.
APPLICATION FILED MAR. 24, 1911. RENEWED AUG. 29, 1912.
1,145,442.  Patented July 6, 1915.
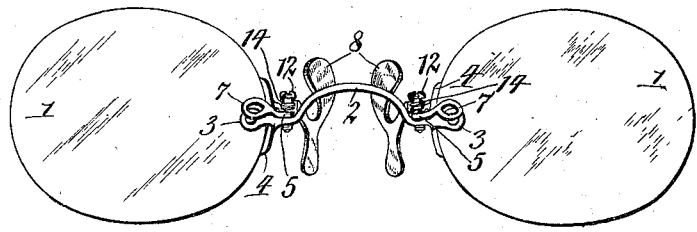
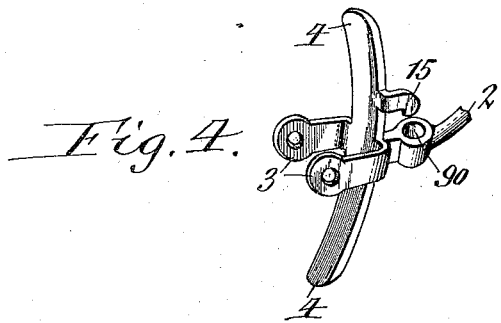
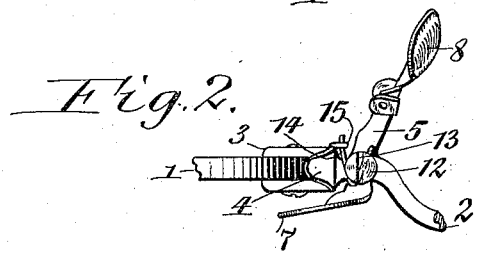
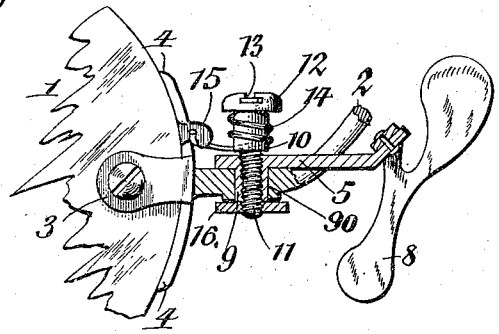 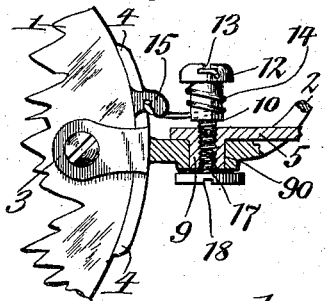
Witnesses:—
Alfred Bokenhagen.
Richard Saumar
Inventor
Herman Silbert
by Geyer & Topp
Attorneys.

UNITED STATES PATENT OFFICE.

HERMAN SILBERT, OF BUFFALO, NEW YORK, ASSIGNOR TO LEO F. ADT, OF ALBANY, NEW YORK.

EYEGLASS-MOUNTING.

1,145,442.  Specification of Letters Patent.  Patented July 6, 1915.

Application filed March 24, 1911, Serial No. 616,600. Renewed August 29, 1912. Serial No. 717,791.

*To all whom it may concern:*

Be it known that I, HERMAN SILBERT, a citizen of the United States, residing at Buffalo, in the county of Erie and State of New York, have invented new and useful Improvements in Eyeglass-Mountings, of which the following is a specification.

This invention relates to finger piece eyeglass mountings and has the object to provide a mounting of this character in which the guards can be readily applied to or removed from the bridge either with the springs attached or after the springs have first been removed to permit of easily applying the proper guards to suit different conditions, and it is also an object to permit of conveniently applying and removing the guard and springs themselves and easily and reliably adjusting them to secure the proper tension.

Further objects of the invention are to provide against wabbling or lost motion in the guards and to improve generally the convenience and efficiency of the mounting, both in use and for assembling and repair.

In the accompanying drawings: Figure 1 is a front view of a pair of eye glasses equipped with my invention. Fig. 2 is a fragmentary top plan view, on an enlarged scale, of one of the guards and adjacent parts of the eye glasses. Fig. 3 is a vertical section of the same. Fig. 4 is a fragmentary perspective view of one end of the bridge and the adjacent clip, wings and spring fastening hook. Fig. 5 is a view similar to Fig. 3 showing a modification of my invention.

Similar letters of reference indicate corresponding parts throughout the several views.

1 represents the lenses, 2 the bridge or nose piece, 3 the clips or straps arranged at opposite ends of the bridge and each secured to opposite sides of one of the lenses and 4 the wings or edge straps arranged on the clips and bearing against the adjacent part of the edge of the lenses.

5, 5 represent the guards which form part of the means for holding the glasses on the nose of the wearer. Each of these guards is constructed in the form of a lever which is pivotally mounted on one end of the bridge and which is provided at one end with a finger piece 7 for manipulating the same and at its other end with a pad or jaw 8 for gripping the nose of the wearer.

My invention concerns the means for pivotally mounting the guards on the bridge and the means for adjusting the tension of the springs. The adaptation of my invention shown in Figs. 1–4 is constructed as follows:—9 represents a vertical tubular pivot wrist or sleeve projecting downwardly from the underside of each guard and rotatably engaging with a pivot or bearing opening 90 in the end of the bridge so that the guard rests on top of the bridge. A screw 10 is provided which serves as part of the means for holding the guard on the bridge and also as part of the means for adjustably securing oné of the tension springs of the mounting. The screw threaded shank 11 of this screw engages with an internal screw thread in the pivot wrist while its head 12 is arranged above the guard and provided with an undercut groove or slot 13 which is substantially T-shaped in cross section. The upper or free end of the screw constitutes a post or projection fixed to the guard lever, but projecting away from the latter and from the support to lie to one side of both and 14 is a spiral spring which surrounds the body of this post 10 above the guard. One end of the spring is turned inwardly to occupy a central position in the region of the axis of the spring and guard and is moved in an axial direction to engage in or be disengaged from the interlocking socket 13 prepared for it by the undercut groove of the screw head which opens in and is accessible from an endwise direction while its other end engages with a hook 15 arranged on the adjacent wing of the lens mount and forming a downwardly facing shoulder.

The screw may be turned for securing the desired tension on the spring by inserting a screw driver in the groove 13 of the screw head and then the adjusting screw is held in place by a securing device, preferably in the form of a clamping screw nut 16 applied to the lower end of the threaded shank of the screw and bearing against the lower end of the sleeve 9 so as to compel the guard and screw 10 to turn together. The nut is thus rigidly connected to the guard lever and arranged closely to the underside of the bridge against which latter it bears so that it prevents the wrist from tipping in the bearing or pivot opening and also prevents the guard from being removed from the bridge under normal conditions.

If desired the jam nut 16 or equivalent means may be omitted in which case the screw 10 is held solely by friction in its adjusted position on the guard and the hook 15 forms the sole means for preventing the guard from being lifted off the bridge.

Upon turning the screw in the direction for increasing the tension on the spring the outer or free end of the latter is carried under the adjacent hook of the bridge and as the mouth of this hook opens downwardly the free end of the spring is held thereby against lifting, whereby the parts are retained in their normal position. Upon continuing to turn the screw in the direction for releasing the tension on the spring after the tension on the latter has been removed the outer end of the spring is carried from under the hook 15 and the guard is free to be lifted off the bridge provided the jam nut 16 is not on the screw. When the spring has been thus detached from the hook 15, this spring, the screw and the respective guard while in an assembled condition may be together removed from the bridge and attached thereto without disturbing the relative position of this guard, screw and spring, thereby permitting repairing and adjusting of the guards to be effected quickly and easily, or else the spring may be slipped over the end of the screw or post by disengaging its inner end from the undercut portion of the slotted socket and removed independently either before or after the removal of the guard lever.

If desired, the adjusting screw may be held in position after adjustment by means of a set screw 17 arranged in the lower end of the threaded pivot sleeve and bearing at its upper end against the lower end of the adjusting screw while its head 18 projects along the underside of the bridge and serves as a stop to prevent the guard from being lifted from the bridge, as shown in Fig. 5.

Owing to the convenience with which this guard can be attached to or removed from the bridge and the facility with which the tension of the spring can be adjusted, it permits the mounting to be readily and quickly adapted to the needs of different persons, thereby saving the time and annoyance frequently incurred when fitting mountings as heretofore constructed.

It will be observed that the post or screw 10 about which the spring coil is centered is detachable from the guard lever so that the spring may be taken off with it for adjustment, substitution or repair, leaving the guard lever in place on the mounting as it is not necessary to withdraw the tubular pivot portion or wrist 9, even though the securing part 16 be detached. Or, the post, spring and lever may be taken off together and intact so far as their relative positions are concerned, which feature is of advantage, for instance, in that it enables these parts to be interchanged as an entirety, readily assembled, on supports or mountings having bridges of different lengths to fit the noses of different wearers. In assembling, generally, the guard lever may be applied first and then the spring and post added while the lever is held by its pivot or wrist in such manner that it cannot become displaced during the process, or else the post and spring may be conveniently applied to the lever first and the assembled parts applied to the bridge by simply adding the nut 16. This is a feature of marked improvement on many of the mountings of the prior art in which a screw or post is used as the key part for securing together the spring, lever and bridge which are meantime held only by the skill of the operator in their relative positions from which the least movement will displace them.

I claim as my invention:

1. In an eyeglass mounting, the combination with a support, of a finger piece guard lever mounted to turn thereon and having a bearing against one side of the support, a part rigidly connected to the lever and bearing against the opposite side of the support to prevent axial movement of the lever, a pivot for the lever extending into the support and coöperating with both bearing portions, a projection located to one side of both the lever and support and in alinement with the pivot and a spring for positioning the guard supported on the projection.

2. In an eyeglass mounting, the combination with a support, of a finger piece guard mounted to turn thereon and having a bearing against one side of the support, a part rigidly connected to the lever and bearing against the opposite side of the support to prevent axial movement of the lever, a pivot for the lever extending through the support and coöperating with both bearing portions, one of the latter being detachable therefrom, a centering projection located to one side of both the lever and support, and in alinement with the pivot and a spring for positioning the guard mounted on the projection.

3. In an eyeglass mounting, the combination with a support and a finger piece guard lever mounted to turn thereon, one of said parts being provided with two spaced bearing surfaces engaging upon opposite sides of the other to prevent axial movement of the lever, of a centering projection arranged in the axis of movement of the lever and carried thereby to project to one side of both the lever and support and to one side of both the bearing surfaces and a guard positioning spring carried by the projection.

4. In an eyeglass mounting, the combination with a support and a finger piece guard lever mounted to turn thereon, one of said parts being provided with two spaced bearing surfaces engaging upon opposite sides of the other to prevent axial movement of the lever, of a removable centering projection carried by and detachably connected to the guard lever in alinement with its axis of movement to project to one side of both the lever and support and a guard positioning spring carried by the projection.

5. In an eyeglass mounting, the combination with a support and a finger piece guard lever mounted to turn on one side thereof, of a projection fixed to the lever in alinement with its axis to project to one side of both the lever and support, a guard positioning spring mounted on the projection, a pivot fixed to the lever and extending into the support and a detachable securing device connected in rigid relation to the lever and bearing against the opposite side of the support.

6. In an eyeglass mounting, the combination with a support and a finger piece guard lever mounted to turn thereon, of a pivot for the lever extending into the support, a member separate from all of the beforementioned parts detachably mounted on the guard lever and a guard positioning spring carried by said member to be removed therewith.

7. In an eyeglass mounting, the combination with a support and a finger piece guard lever mounted to turn thereon, of a projection on one side of the lever extending into the support to provide a pivot, a guard positioning spring coiled about the axis of the lever and a centering projection for the spring on the opposite side of the lever extending away from the support to one side of the latter and of the lever.

8. In an eyeglass mounting, the combination with a support and a finger piece guard lever mounted to turn thereon, of a tubular projection on the lever extending from one side thereof into the support to constitute a pivot, a post extending into the said projection but arranged to project from the opposite side of the lever and a guard positioning spring carried on the post.

9. In an eyeglass mounting, the combination with a support and a finger piece guard lever mounted to turn on one side thereof, of a tubular projection on the lever extending from one side thereof into the support to constitute a pivot, a threaded post extending through the projection but arranged to project from the opposite side of the lever, a guard positioning spring carried on the post and a detachable securing device co-operating with the post on the opposite side of the support from that on which the guard lever is arranged and bearing against the support to prevent axial movement of the guard lever.

10. In an eyeglass mounting, the combination with a support and a finger piece guard lever mounted to turn thereon, of a member having threaded engagement with one of said parts, a spring coiled concentrically with respect to said member and having one end connected thereto and the other end connected to the other part and a separate securing device having threaded engagement with the member to lock it against rotation.

11. In an eyeglass mounting, the combination with a support and a finger piece guard lever mounted to turn thereon, of a threaded post mounted on the lever, and a guard positioning spring coiled about the post and having one end connected thereto and the other end connected to a fixed part whereby rotation of the post on its threads varies the tension of the spring.

12. In an eyeglass mounting, the combination with a support and a finger piece guard lever mounted to turn thereon, of a post on one of said parts having an undercut slot at its outer end and a guard positioning spring coiled about the post and having one end arranged in the slot to act against the post and locked against disengagement by a normal tendency to engage beneath the undercut portion due to its own elasticity.

13. In an eyeglass mounting, the combination with a support and a finger piece guard lever mounted to turn thereon, of a screw threaded into one of said parts and having the channel or slot in its outer end undercut, and a guard positioning spring coiled about the screw and having one end arranged in the slot or channel thereof to act against the screw, the said end being locked against disengagement by a normal tendency to engage beneath the undercut portion under the influence of its own elasticity.

14. In an eyeglass mounting, the combination with a support and a finger piece guard lever mounted to turn thereon, of a screw threaded into one of said parts and a spring coiled about the screw, the channel in the head of the latter being utilized as a fastening means for one end of the spring.

15. An eyeglass mounting comprising a bridge provided at its ends with lens mounts and each mount being provided with a hook, guards pivoted on said bridge, adjusting screws mounted on said guards, and springs each connected at one end with one of said screws and engaging its other end with said hook.

16. An eye glass mounting comprising a bridge provided at its ends with lens mounts and each mount being provided with a hook and the bridge being also provided adjacent to the lens mounts with pivot openings, guards pivoted in the pivot openings, adjusting screws mounted on the guards, and springs each connected at one end with one of said screws and engaging its opposite end with the adjacent hook.

17. An eye glass mounting comprising a bridge provided at its ends with lens mounts and each mount being provided with a hook and the bridge being also provided adjacent to its mounts with pivot openings, guards each provided with a pivot sleeve entering said pivot openings, screws engaging said sleeves, and springs each engaging one of said screws and one of said hooks.

18. An eye glass mounting comprising a bridge provided at its ends with lens mounts and each mount being provided with a hook and the bridge being also provided with pivot openings, guards each having a tubular pivot wrist journaled in one of said pivot openings, an adjusting screw engaging with said wrist, and springs each connected at one end with one of said screws and engaging its other end with the adjacent hook of the lens mount.

19. An eye glass mounting comprising a bridge provided at its ends with lens mounts and each mount being provided with a hook and the bridge being also provided with pivot openings, guards each having a tubular pivot wrist journaled in one of said pivot openings, an adjusting screw engaging with said wrist, springs each connected at one end with one of said screws and engaging its other end with the adjacent hook of the lens mount, and means for holding said screws against turning in said pivot wrist.

20. An eye glass mounting comprising a bridge provided at its ends with lens mounts and each mount being provided with a hook and the bridge being also provided with pivot openings, guards each having a tubular pivot wrist journaled in one of said pivot openings, an adjusting screw engaging with said wrist, and springs each connected at one end with one of said screws and engaging its other end with the adjacent hook of the lens mount and means for holding said screws against turning in said pivot wrist and consisting of screw nuts applied to said screws and arranged on that side of the bridge opposite to that on which the guards are arranged.

21. An eye glass mounting comprising a bridge provided at its ends with lens mounts and each mount being provided with a hook and the bridge being also provided with pivot openings, guards each having a tubular pivot wrist journaled in one of said pivot openings, an adjusting screw engaging with said wrist and having an undercut groove in its head, and springs each surrounding one of said screws and engaging one of its ends with the undercut groove in the screw head while its other end engages with the hook on the adjacent lens mount.

22. An eye glass mounting comprising a bridge having lens mounts, a guard pivoted on the bridge, a screw arranged on the guard, and a spring engaging with said lens mount and connected with said screw so as to be removable with the screw and guard from the bridge and normally operating to hold said guard yieldingly in pivotal engagement with said bridge.

23. An eyeglass-mounting having, in combination, with a support, a nose-clamp and a pivotally-movable lever connected therewith, a coiled spring for positioning the nose clamp connected, at one end, with one of said parts, and a post upon which the coiled portion of the spring is mounted, the post being slotted to receive the other end of the spring and having inward projections at the upper end of the slot, adapted to retain the spring on the post when its end assumes an angular position in the slot in consequence of the torsional action of the spring.

24. In an eyeglass mounting, the combination with a support having a bearing aperture therein, of a finger piece guard lever, provided with a pivot portion turning in the bearing aperture and carrying a socket rotatable therewith, and a detachable guard positioning spring arranged to one side of both the lever and support and having one end engaged within the socket and the other end acting against the support.

25. In an eyeglass mounting, the combination with a support, of a finger piece guard lever mounted to turn thereon and provided with an axially extending member having a socket therein rotatable therewith and a detachable coil spring for positioning the guard arranged to one side of both the lever and support and having one end arranged centrally of the coil and engaged within the socket and the other end acting against the support.

26. In an eyeglass mounting, the combination with a support having a bearing aperture therein, of a finger piece guard lever provided with a pivot portion turning in the bearing and with a centrally arranged socket turning therewith and opening in an axial direction, and a detachable guard positioning spring arranged to one side of both lever and support and having an inwardly disposed end engaged within the socket and an outwardly disposed end acting against the support.

27. In an eyeglass mounting, the combination with a support having a bearing aperture therein, of a finger piece guard lever provided with a pivot portion turning in the bearing aperture and carrying a socket rotatable therewith, said lever also having rigidly connected surfaces engaging upon opposite sides of the support to prevent axial movement, and a detachable guard positioning spring arranged to one side of both the lever and support and having one end engaged within the socket and the other end acting against the support.

28. In an eyeglass mounting, the combination with a support having a bearing aperture therein, and a guard lever arranged to turn thereon with one side adjacent to the support and provided with a pivot projection engaging the bearing aperture, of a projection fixed to the lever and proceeding from the other side thereof in a direction away from the support, and a coil spring for positioning the guard surrounding the projections.

29. In an eyeglass mounting, the combination with the bridge connection and the swinging levers carrying the nose grips, of members rotatably mounted in one of the two first mentioned parts, springs surrounding the members and directly connected at one end to the members and at the other end to the other of said first mentioned parts and means for securing the members in any desired angular position.

Witness my hand this 23rd day of March, 1911.

HERMAN SILBERT.

Witnesses:
 THEO. L. POPP,
 ANNA HEIGIS.

Copies of this patent may be obtained for five cents each, by addressing the "Commissioner of Patents, Washington, D. C."